Figure 1:
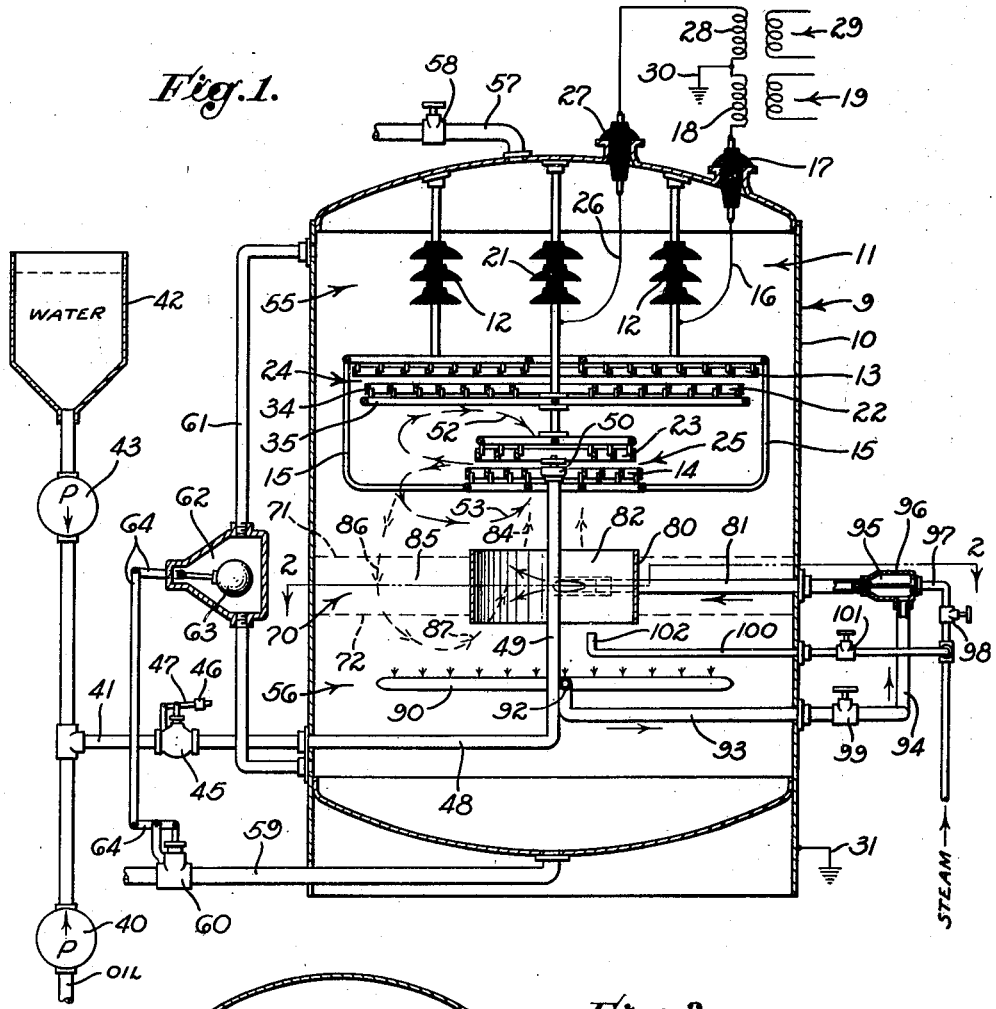

June 5, 1945. L. E. McDONALD 2,377,565
METHOD OF RESOLVING WATER-IN-OIL EMULSIONS
Filed April 23, 1940

INVENTOR
LOUIS E. McDONALD
BY HARRIS, KIECH, FOSTER & HARRIS
*Lawrence F. Kiech*
FOR THE FIRM
ATTORNEYS.

Patented June 5, 1945

UNITED STATES PATENT OFFICE 2,377,565

METHOD OF RESOLVING WATER-IN-OIL EMULSIONS

Louis E. McDonald, Houston, Tex., assignor to Petrolite Corporation, Ltd., Wilmington, Del., a corporation of Delaware Application April 23, 1940, Serial No. 331,126

15 Claims. (Cl. 204—190)

My invention relates to the resolution of emulsions and, more particularly, to a novel method for resolving or preventing sludge accumulations in a separation zone in which the emulsion constituents are settled or otherwise separated by difference in specific gravity. Such separation usually follows the application of some emulsion-treating expedient, such as the use of chemicals, heat and pressure, and/or an electric field. The invention is particularly well adapted to the resolution or prevention of sludge in an electric treater used to resolve a natural or artificial water-in-oil emulsion, and will be particularly described in this connection.

The prevention of sludge accumulations is sometimes a problem in the electric dehydration of crude oil emulsions, though the problem in this industry is usually not severe. Such processes have for their purpose a reduction in the amount of water in the emulsion to produce a marketable oil. More recently, the electric process has come into general use in the purification of oils containing very little or no water, to remove various impurities which, upon heating in subsequent refinery equipment, may cause corrosion or deposition, or which may deleteriously affect the refinery products. The minimizing of sludge and the prevention of sludge accumulations in the electric treater are quite necessary in such processes, particularly as such purifying processes are conventionally operated on-stream with regard to the refining equipment and because increasing sludge accumulations represent not only an economic waste of oil but interfere seriously with the continuity of operation of the process. The present invention is particularly applicable to the solution of this problem and will be described with reference to such a purification process without intent to limit the invention thereto.

Such a purification process has for its object the removal from an oil of water-associable impurities, such as water-soluble or water-wettable materials. If the incoming oil contains water, it is often found that water-dissolved impurities are present dissolved in the dispersed water droplets. Commonly, such dispersed water droplets are of a salty nature and will be hereinafter referred to as brine droplets, i. e., droplets in which various salts or other impurities are present. Regardless of whether or not water is present in the oil, dispersed water-soluble or water-wettable solids may be present. The starting material for the purification process comprises such an oil containing impurities and containing no more than a few per cent of water.

The purification process involves dispersing into such an oil a relatively fresh water, i. e., a water capable of taking up or becoming associated with the impurities when the resulting emulsion is subjected to the coalescing action of an appropriate electric field. The action in this field is to bring together the impurities and the relatively fresh water and to coalesce the dispersed water into masses of sufficient size to be separable from the oil, for example by gravitational separation. The dispersion or emulsion is formed by any suitable means, typically a weight-loaded emulsifying valve, and should be of such character as to be readily treatable by the electric field. Best results are obtained by use of a limited mixing action and by avoidance of such intense mixing action as would predominantly combine the impurities and the relatively fresh water in the mixing step.

Under certain operating conditions and on certain oils, it has been found that such a purifying process tends to result in an accumulating sludge layer in the zone of separation between the body of treated oil and the body of separated water now containing the impurities. Such sludge accumulations, if allowed to continue, will in some instances render ineffective the electric field and will contaminate the effluent water or pervade the entire lower portion of the separating zone so that sludge rather than water which is substantially oil-free, will be withdrawn.

While such sludge accumulations can usually be avoided by employment of a less intensive mixing action, this is often at the expense of the high purification efficiency desired. Correspondingly, where the purification efficiency of the process is to be high, it is desirable to employ other means for preventing sludge accumulations, and it is an object of the present invention to provide a novel method and apparatus useful in this regard.

The sludges with which this invention is primarily concerned can be considered as being of two types, herein-termed "coarse-grained sludge" and "fine-grained sludge." Both types are essentially of the water-in-oil type, in that the dispersed phase is formed of water and the external or continuous phase is formed of oil or oily material. Both types comprise incompletely resolved emulsion and while, in some instances, either type may tend to separate into its constituents when permitted to stand for prolonged periods of time, this may not be possible in commercial practice under the treater throughputs and operating conditions preferably utilized It is not uncommon to find that the material present in the sludge zone of the treater comprises almost completely an emulsion of the water-in-oil type. On the other hand, it is possible for masses of this sludge to appear as dispersed entities in the body of water, in which event the external phase may comprise water and the dispersed phase may comprise discrete sludge masses which, in themselves, may be constituted of a water-in-oil type emulsion. If this condition is allowed to continue, the effluent water from the treater will be undesirably contaminated.

The first type of sludge noted above, namely coarse-grained sludge, is generally of a coarse, loose, or baggy nature. This structure is of the honeycomb type in that it is constituted largely of water particles of substantial size, typically $\frac{1}{16}$ of an inch in diameter or larger, surrounded by oily membranes or skins. Such water masses are the result of prior coalescence in, or following the application of, an electric field. The amount of oil or external phase associated with this type of sludge may be quite small and may be present largely in the oily membranes or sacs which enclose the relatively large water masses.

The formation of this type of sludge is believed to be due to the presence of irreversibly adsorbed material which is either in solid form initially or which solidifies after adsorption. As coalescence proceeds, the area to volume ratio of the dispersed droplets decreases so that the settling coalesced water masses carry with them relatively permanent membranes which tend to prevent the coalesced water masses from further and immediately coalescing with the main body of water at the interface between the body of water and the sludge zone. Often, such membranes can be ruptured by the establishment of controlled circulation paths in or adjacent the sludge and/or by thermal effects, and it is an object of the present invention to provide a novel method and apparatus for accomplishing this result.

The second type of sludge, namely the fine-grained type, is usually a compacted water-in-oil emulsion in which the aqueous droplets are for the most part very small and represent droplets originally present in the untreated emulsion and droplets which have been somewhat increased in size by coalescence during treatment but not to the extent necessary to complete separation. The degree of compaction may vary up to an emulsion containing a very large amount of water. Such sludges may form when separating emulsion constituents which have been subjected to various treating actions tending to induce coalescence, such as subjection to the action of an electric field or use of suitable chemicals. This type of sludge represents the more serious problem in electrical purification processes as the small water droplets tend to settle only very gradually and to accumulate and build up in a region which is herein-termed a "sludge zone" between the bodies of purified oil and water.

Such compacted fine-grained sludges are, in some instances, stabilized by the irreversibly adsorbed materials described above. In many instances, this sludge is very highly concentrated in the impurities removed from the oil, though, in other instances, the sludge may not be thus highly concentrated and, in fact, the water content thereof may contain less of the impurities than does the water effluent from the treater.

I have found that resolution of this type of sludge can be aided by the selective application of heat, and it is an object of the present invention to provide a novel method for accomplishing this end.

It has further been found that resolution of either type of sludge can be aided by the injection of a hot aqueous medium into the separating zone at a position in or adjacent the sludge layer, and it is another object of the invention to introduce such an aqueous medium in this manner and, in some instances, to draw water from the separating zone, apply heat thereto, and re-introduce the water at a position in or adjacent the sludge zone.

It is still a further object of the invention to aid in the resolution of either type of sludge by the injection of steam into the separating zone at a position adjacent the sludge zone. Preferably, this steam is introduced in a water-continuous environment so that the minute particles of water resulting from condensation of the steam will be combined immediately with the water-continuous environment rather than being dispersed in an oil environment. In other instances, however, steam can be introduced into an oil environment, particularly if subsequent electric treatment is utilized, and this mode of operation is contemplated in the objects of the invention.

It is another object of the invention to apply heat selectively to the central portion of a separating zone and, preferably, at a position adjacent or within the sludge zone. This permits the establishment of a desirable thermal circulation from this central portion upward toward the electric field.

It is another object of the invention to introduce a hot medium into this central portion of the separating zone adjacent or within the sludge zone in such manner as to set up a circulation in a horizontal plane.

Another object of the invention is to provide a sludge-resolving aid which can be made to cooperate with an electrode system to assist in the resolution of sludge or to prevent an undesirable accumulation thereof.

Further objects and advantages of the invention will be evident to those skilled in the art from the following description of an exemplary embodiment of the invention.

Figure 2:
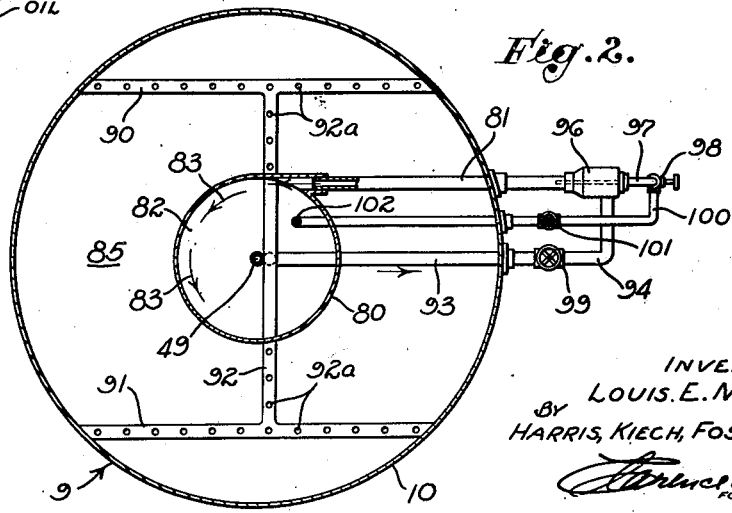

Referring to the drawing:

Figure 1 is a vertical sectional view of an electric treater useful in dehydration or purification processes and incorporating a selected embodiment of the invention; and Figure 2 is a horizontal sectional view taken on the line 2—2 of Figure 1.

Referring particularly to Figure 1, the electric treater is indicated generally by the numeral 9 and includes a tank 10 enclosing a separating chamber 11. Suspended therein by insulators 12 are electrodes 13 and 14 mechanically and electrically interconnected by rods 15 and energized through a conductor 16 extending through a bushing 17 and connected to one terminal of a secondary winding 18 of a transformer 19.

Also suspended in the separating chamber 11 by insulator 21 is an intermediate electrode structure comprising electrodes 22 and 23 respectively cooperating with the electrodes 13 and 14 in defining upper and main treating spaces 24 and 25. The intermediate electrode structure is energized through a conductor 26 extending through a bushing 27 and connected to one terminal of a secondary winding 28 of a transformer 29. The remaining terminals of the secondary windings 18 and 28 are connected together and grounded as indicated by the numeral 30. The tank 10 likewise is grounded, as indicated by the numeral 31.

By connecting the transformers 19 and 29 in additive relation, a potential can be impressed across the treating spaces 24 and 25 which is equal to the sum of the voltages produced by these transformers. At the same time, the potential between any one of the electrodes 13, 14, 22, or 23 and any grounded portion of the equipment will be equal to the voltage developed by only one of the transformers 19 and 29.

As shown, each of the electrodes 13, 14, 22, and 23 comprises a plurality of concentric metallic rings, one of which is indicated by the numeral 34, which are retained by a suitable framework, for example outward-extending arms 35. This particular electrode structure is not per se a part of the present invention and various constructions can be used.

The oil to be purified, containing no more than a few per cent of water, is delivered by a pump 40 to a pipe 41. The relatively fresh water may be withdrawn from a tank 42 and proportioned into the pipe 41 by a pump 43. A preliminary admixture is thus formed and further mixing or emulsification can take place in a mixing means 45 with which the pipe 41 communicates. This means is shown as comprising a weight-loaded valve and the mixing action can be varied by shifting the position of a weight 46 on an arm 47 to produce the desired water-in-oil type of electrically-treatable emulsion.

This artificial emulsion is introduced into the tank 10 through a pipe 48 which communicates with a riser pipe 49 extending upward to a distributor 50, which discharges radially outward into the treating space 25. The entire electrode structure is submerged in an oil environment and the jetting of the emulsion outward into the treating space 25 tends to establish circulation of fluid through upper and lower internal recirculation paths, indicated respectively by the full-lined arrows 52 and 53, so that material is reintroduced into the field established in the treating space 25 both from a position above the electrode 23 and below the electrode 14.

For a more detailed description of the structure thus far described, reference is made to U. S. Patent No. 2,182,145, to Harold C. Eddy. In that patent, there is described a mode of operation of such a structure in which an oil containing no more than a few per cent of water can be purified by incorporating thereinto a relatively fresh water to coexist in large measure with the impurities. Electric treatment in the tank 10 serves to bring the relatively fresh water and the impurities together and to coalesce the water into masses of sufficient size to gravitate from the oil. There is described therein a process in which substantially complete resolution of the artificial emulsion can be obtained with the aid of an electric field so that there is no such accumulation of sludge as would interfere with the maintenance of the electric field. Generally speaking, the conditions and the mode of operation set forth in that patent can be maintained in the treater herein-contemplated, but improved results will flow from the use of the present invention in conjunction therewith. In other instances, the conditions set forth in the Eddy patent supra can sometimes be departed from if the present invention is used. For example, the present invention permits more intimate mixing of the relatively fresh water and the incoming oil, without accumulation of such amount of sludge as would interfere with the continuity of the process. This invention is also particularly applicable to those oils which appear to have a distinct sludging tendency and which are sometimes difficult to handle at high throughputs and with high percentage removal of impurities without the use of auxiliary sludge-resolving aids.

In general, such a purification process works best if the following conditions are present: The incoming oil should be of such character as to withstand the dielectric stresses contemplated without breakdown. Its contents in the impurities mentioned above may vary over wide limits, but if any dispersed water is present therein, the amount thereof should be not more than a few per cent. Generally speaking, the lower the water content the more complete is the removal of impurities, and the process is commonly used on oils containing not more than 3% of water, though it can be used in some instances on oils containing up to about 8% of water. The amount of relatively fresh water used will be sufficient to take up the water-associable impurities and this amount will ordinarily be from 5-50% by volume of the oil. Most commonly, from 8-20% of relatively fresh water is used. By the term "relatively fresh water" reference is had to a water which, if it contains any of the impurities to be removed, has a materially less concentration thereof than does the dispersed water, or, if the oil carries no dispersed impurity-containing water, the term has reference to a water which has no more than a small concentration of the impurities to be removed. This water need not be entirely devoid of the impurities to be removed and, in some instances, may contain these impurities in relatively low concentration. It may also contain various chemicals assisting in the process.

It is preferable that electric treatment should take place under superatmospheric temperature. The oil or the relatively fresh water, or both, can be preheated, or the mixed stream can be heated prior to introduction into the field. Sufficient pressure is maintained in the tank 10 to prevent vaporization of the more volatile fractions or of the water. The intensity of the mixing action employed will vary with different oils, but should be sufficient to produce adequate removal of impurities yet it should be sufficiently limited to form an artificial emulsion which can be ultimately resolved substantially completely into oil and water with the aid of the sludge-processing steps hereinafter disclosed.

Electric treatment in the tank 10 results in the separation of the electrically-treated constituents into a body of treated oil 55, positioned in a treated-oil zone of the separating chamber 11, and a body of separated water 56 which now contains in large measure the water-associable impurities originally present in the incoming oil and which collects in a water zone of the separating chamber 11. The treated oil will still contain a small amount of dispersed water but will usually contain less than 10% of the impurities present in the incoming oil. This treated oil can be withdrawn continuously from the separating chamber 11 by a pipe 57, as controlled by a valve 58, and, if desired, delivered directly to subsequent refinery equipment, or the treated oil may be temporarily stored before such refining. The separated water may be continuously or intermittently withdrawn from the lower end of the separating chamber 11 through a pipe 59, as determined by the setting of a valve 60.

Means is preferably provided for controlling the valve 60 in response to changes in the relative amounts of water and oil in the separating chamber 11. As shown, this means includes a side passage 61 communicating at its upper end with the body of oil 55 and at its lower end with the body of water 56, and includes a float chamber 62 at a position substantially opposite the interfacial zone of the separating chamber 11. A float 63 is of such density as to sink in oil and float in water so as to move up and down in response to changes in the position of the oil-water interface in the chamber 62. This movement of the float 63 is transmitted through linkage 64 to the valve 60 in such manner that the quantity of water removed from the separating chamber 11 will be such as to maintain the interface in the float chamber 62 substantially constant in height and, correspondingly, to maintain the total amount of water in the tank 10 substantially constant.

In treating certain oils under certain treating conditions, it is found that there is a tendency for sludge to be present and to build up in an intermediate or sludge zone between the bodies of oil and water indicated by the numerals 55 and 56. For purposes of explanation, this sludge zone has been indicated, in general, in Figure 1 by the numeral 70 and is shown as being bounded by dotted lines 71 and 72. These dotted lines indicate approximately the transition between the sludge layer and the bodies of oil and water during one mode of operation and prior to the time that the sludge-resolving features of the invention are set into operation. It should be understood that the indicated sludge zone 70 indicates the general region in which sludge tends to accumulate and build up. By use of the invention, it is sometimes possible to render any sludge layer practically non-existent, the invention being used to avoid the accumulation of sludge in the zone 70, although, in other instances, the invention can be brought into operation after formation of a sludge layer, in which event it will aid in resolving the sludge and will prevent such further sludge accumulation as would tend to build up to short-circuit the electrodes or require that the sludge be withdrawn as such from the treater. It is very difficult to indicate definitely the boundary, suggested by the line 71, between the sludge and the body of oil as the degree of compaction of the fine-grained sludge decreases progressively upward from the body of water 56. The boundary suggested by the line 72 is somewhat more pronounced and often represents the transition between an oil-continuous zone and a water-continuous zone. However, during the operation of the invention, the boundary indicated by the dotted line 72 may shift in position, as will be hereinafter described.

Disposed adjacent the sludge zone 70, and preferably in the central portion of the separating chamber 11, is a cylindrical sleeve 80 supported by a pipe 81 and, if desired, by any additional means. As best shown in Figures 1 and 2, the pipe 81 is adapted to discharge a hot aqueous medium into a circulation chamber 82 defined by the sleeve 80. This introduction is preferably tangential so that the introduction of the hot aqueous medium establishes a rotation within the circulation chamber 82, as indicated by the arrows 83. Due to this circulation and to the fact that the temperature in the circulation chamber 82 is higher than in the adjacent portions of the separating chamber 11, the liquid moving as indicated by the arrows 83 will tend to rise, as indicated generally by the dotted arrows 84, toward the lower electrode 14, and will thus join the circulation indicated by the arrows 53 so that the composite material will be again subjected to electric stress in the treating space 25. In addition to this electric stress, the liquid moving as indicated by the arrows 53 and 84 will be subjected to an auxiliary electric field between the lower electrode 14 and the sleeve 80, for this sleeve is maintained at ground potential. This auxiliary field and the field in the main treating space 25 can thus be used to treat additionally any sludge moving through the paths indicated by the arrows 53 or 84.

The upward circulation indicated generally by the dotted arrows 84 and caused by thermal and/or injection effects will tend to establish a gentle downward flow through the annular space 85 between the sleeve 80 and the tank 10. This downward circulation is indicated generally by the dotted arrows 86 and will tend to displace the sludge layer downward so that the lower boundary indicated by the dotted line 72 may move beneath the lower edge of the sleeve 80, thus permitting sludge to be drawn inward and upward, as indicated by the dotted arrows 87, into the circulation chamber 82 where it is mixed with the incoming aqueous material and where its temperature may be increased.

The aqueous medium which I prefer to introduce into the circulation chamber 82 comprises a portion of the water withdrawn from the body of water 56. It is preferred to withdraw water from this body at a plurality of points distributed in a horizontal plane below the lower end of the sleeve 80. As best shown in Figure 2, this may be accomplished by a perforated pipe structure including end pipes 90 and 91 respectively connected to the inner walls of the tank 10 by any suitable means, such as welding, and a cross pipe 92. Perforations 92a are provided in the upper portion of each of the pipes 90, 91, and 92 in the zone below the annular space 85, no perforations being provided in the space below the circulation chamber 82. The cross pipe 92 is connected to a pipe 93 which extends outside the tank 10 to carry water to a suitable heating means through a pipe 94, the heating means being connected to the pipe 81 to conduct the water to the circulation chamber 82. Various types of heating means can be used in this connection and any desired means can be used to assist in this circulation. Very satisfactory results have been obtained by the use of a steam jet serving in both capacities. For example, pipes 94 and 81 can communicate with each other through an enlarged chamber 95 formed by a housing 96. Steam may be conducted into the structure from a pipe 97 extending through the chamber 95 and into the pipe 81. Thus, when a valve 98 in the steam pipe 97 is opened, a jet of steam will be discharged into the pipe 81 in a manner to draw water through the perforations of the pipes 90, 91, and 92 and through the pipes 93 and 94. As the steam condenses, it gives up its latent heat of vaporization to the stream of water so that the resulting stream of aqueous material discharged into the circulation chamber 82 will be at a temperature higher than the temperature of the body of water 56. Discharge temperatures up to the boiling point of water at the existing pressures can be used. On the other hand, even higher temperatures can often be used, in which event some uncondensed steam will be discharged from the pipe 81 into the circulation chamber 82 and will be condensed therein or during upward movement therefrom.

In some instances, the aqueous medium introduced into the circulation chamber 82 may be steam alone. This can be accomplished by closing a valve 99 in the pipe 94 to prevent circulation of water. In this event, the steam will be discharged tangentially into the circulation chamber 82 and will condense when it meets the cooler liquid therein or when it meets the cooler liquid thereabove.

In other instances, it has been found advantageous to introduce steam into the separating chamber 11 through means other than the pipe 81. For example, a branch steam pipe 100 equipped with a valve 101 may extend from the steam pipe 97 to an orifice 102. The discharge of the steam is preferably adjacent the sludge zone 70 and, while the orifice 102 may be variously positioned in the tank 10, as by bending the branch pipe 100, it is usually advantageous to discharge the steam in the central portion of the separating chamber 11, for example, below the circulation chamber 82 as shown in Figure 1. In other instances, it is possible to dispense with the sleeve 80 and the circulation chamber 82 and supply the steam exclusively through the orifice 102.

The introduction of a hot aqueous medium into the central portion of the separating chamber 11 within or adjacent the sludge zone serves also to heat selectively the adjacent material. By use of the invention, the temperature adjacent the sludge zone can be maintained higher than in other portions of the treater, and selective heating adjacent the sludge zone appears to soften or modify the emulsifying agents of the sludge in a manner tending to resolve the sludge. This is often the case irrespective of subsequent electric re-treatment of the sludge.

Irrespective of whether the steam comes into contact with the liquid in or adjacent the sludge zone before condensing or after condensation, it is desirable to correlate the amount of heat derived from the steam with the heat of the incoming emulsion. It is never desired to use such an amount of steam or such an amount of localized heat as would bring the contents of the separating chamber 11 to such temperature that steam might accumulate at the upper end thereof. Upward movement of steam through the upper portion of the body of oil 55 is detrimental to separation. Correspondingly, the temperature in at least the upper portion of the tank 10 should be maintained below the boiling point of the water at the existing pressure. If the emulsion introduced through the pipe 48 is already near the boiling point, then steam can be supplied through the pipes 97 or 100 intermittently to aid in sludge resolution. On the other hand, if the temperature of the incoming emulsion is lower, steam may be supplied continuously to heat selectively the materials in the tank 10, maintaining the supply of steam insufficient to raise the temperature of the contents above the boiling point of water at the existing pressure.

Correspondingly, it will be apparent that the sludge-resolving action of the invention can be applied either intermittently or continuously. If applied intermittently, sludge can be permitted to accumulate to some extent between times and such sludge accumulations can be quickly resolved to such an extent as to be unobjectionable by periodically opening the valves 99 or 101. During such times as the sludge-resolving system is not in operation, some sludge may accumulate in the sludge zone 70 or may even pervade a portion or all of the body of water 56. In the latter event, injection of steam through the orifice 102 or into the circulating stream of water will bring the steam directly into contact with the sludge and the resulting localized heating will, in itself, tend to destabilize the sludge to such an extent that resolution into its oil and water components may be effected to a large extent without subsequent electric treatment. On the other hand, by the setting up of the upward circulation as indicated by the dotted arrows 84, the sludge can be further subjected to the action of an electric field to aid in this resolution.

While the invention has been particularly described with reference to an electric purification process, it is also applicable in general to electrical dehydration of petroleum emulsions or to other systems in which bodies of oil and water tend to separate with a layer of sludge therebetween. The present invention can be used to improve the general operation of such other processes and, in some instances, insures continuity of operation which could not otherwise be obtained.

Various changes and modifications can be made without departing from the spirit of the invention as defined in the appended claims.

I claim as my invention:

1. A method of resolving a water-in-oil type of emulsion, which method includes the steps of: subjecting said emulsion to the action of an electric field to coalesce at least a portion of the dispersed water into gravitationally separable masses and subjecting the electrically-treated constituents to gravitational action in a chamber, whereby bodies of oil and water form in this chamber, said constituents tending to form a layer of sludge in a sludge zone adjacent said body of water; and introducing into said chamber in the immediate vicinity of said sludge zone a stream of aqueous material which is at a temperature above that of said electrically-treated constituents to aid directly in the resolution of said sludge, the position at which said stream of aqueous material is introduced being between the upper boundary of said sludge zone and a level just below the lower boundary of said sludge zone.

2. A method of resolving a water-in-oil type of emulsion, which method includes the steps of: subjecting said emulsion to the action of an electric field to coalesce at least a portion of the dispersed water into gravitationally separable masses and subjecting the electrically-treated constituents to gravitational action in a chamber, whereby bodies of oil and water form in this chamber, said constituents tending to form a layer of sludge in a sludge zone adjacent said body of water; and injecting steam into said chamber at a level adjacent said sludge zone to condense said steam and impart heat selectively to said sludge zone to aid directly in the resolution of said sludge.

3. A method as defined in claim 1, in which said stream of aqueous material is formed by withdrawing water from said body of water to form a stream of water, applying heat to said stream of water, and discharging the resulting heated stream in the vicinity of said sludge zone.

4. A method as defined in claim 1, in which said stream of aqueous material is formed by withdrawing water from said body of water to form a stream of water, injecting steam into said stream of water, and discharging the resulting heated stream in the vicinity of said sludge zone.

5. A method of forming and resolving a water-in-oil type of emulsion, which method includes the steps of: mixing proportioned amounts of oil and water to form an emulsion; continually introducing this emulsion into an oil environment in a chamber and subjecting this emulsion to the action of an electric field to coalesce at least a portion of the dispersed water into gravitationally separable masses which drop in said chamber to form a body of water therein; withdrawing water and oil respectively from the lower and upper ends of said chamber at such rates as to maintain the amounts of oil and water in said chamber substantially constant; controlling the intimacy of said mixing of said oil and water with reference to said rates of withdrawal so that sludge tends to accumulate in a sludge zone adjacent said body of water, this sludge tending to short-circuit said electric field if permitted to accumulate until it reaches said field; and selectively heating the central portion of said sludge zone to a temperature higher than the average temperature in said chamber and higher than the average temperature of said sludge zone to aid directly in the resolution of said sludge, and to establish an upward thermal circulation from said sludge zone to said electric field.

6. A method of forming and resolving a water-in-oil type of emulsion by treating same in a chamber containing bodies of oil and water, which method includes the steps of: mixing proportioned amounts of oil and water to form an emulsion; continually introducing this emulsion into an oil-containing portion of said chamber and subjecting this emulsion to the action of an electric field to coalesce at least a portion of the dispersed water into gravitationally separable masses which drop in said chamber to form a body of water therein; withdrawing water and oil respectively from the lower and upper ends of said chamber at such rates as to maintain the amounts of oil and water in said chamber substantially constant; controlling the intimacy of said mixing of said oil and water with reference to said rates of withdrawal so that sludge tends to form in a sludge zone adjacent said body of water; and introducing into said chamber near the central portion of said sludge zone a stream of steam which is at a temperature above the average temperature of the liquid in said chamber to aid directly in the resolution of said sludge and to set up an upward thermal circulation from the vicinity of said sludge zone toward said electric field, which circulation carries a portion of the sludge upward to said field for re-treatment.

7. A method as defined in claim 1, in which said stream of aqueous material is formed by withdrawing water from said body of water, heating the water thus withdrawn at a position outside said chamber, and re-introducing the stream of heated water into said chamber substantially horizontally at a position near said sludge zone and tangentially with respect to a circle concentric with a point in the vertical axis of said chamber.

8. A method as defined in claim 2, in which said steam is introduced into said chamber in an upward direction to force material upward from said sludge zone toward said electric field.

9. A method of resolving a water-in-oil type of emulsion in a chamber containing bodies of oil and water, which method involves the use of an electrode disposed in said body of oil and which method includes the steps of: establishing an electric field in a space bounded by said electrode, said field being of sufficient intensity to coalesce the dispersed phase of a water-in-oil type emulsion delivered thereto; continuously jetting a stream of said emulsion into said electric field in a manner to establish a closed circulation path around said electrode through which previously-treated material returns to said field adjacent the point of jetting of said stream of emulsion into said field, the previously-treated material in the lowermost portion of said circulation path moving substantially horizontally toward said point of jetting; withdrawing water and oil respectively from the lower and upper ends of said chamber at such rates as to maintain the amount of oil and water in said chamber substantially constant and at such rates that sludge tends to form in a sludge zone between said bodies of oil and water; and selectively heating the central portion of said sludge zone to a temperature higher than the average temperature in said chamber and higher than the average temperature of said sludge zone by introducing into said chamber near the central portion of said sludge zone a stream of hot aqueous material which is at a temperature above the average temperature in said chamber to aid directly in the resolution of said sludge and to establish an upward thermal circulation of material from said sludge zone toward said lowermost portion of said circulation path whereby sludge is moved into said lowermost portion of said circulation path for re-treatment in said electric field.

10. A method as defined in claim 9, in which said aqueous material comprises steam discharged into said chamber in an upward direction at a position within said body of water just below said sludge to assist in the movement of said material from said sludge zone into said lowermost portion of said circulation path.

11. A method of resolving a water-in-oil type emulsion, which method includes the steps of: subjecting said emulsion to the action of an electric field of sufficient intensity to coalesce at least a portion of the dispersed water and subjecting the electrically-treated constituents to a gravitational separating action in a chamber to form bodies of oil and water in said chamber separated by a layer of sludge in a sludge zone adjacent said body of water; withdrawing water from said separated body of water at a plurality of positions spaced substantially horizontally from each other and which positions are substantially below said sludge zone to form a stream of water; heating said stream of water; and discharging the heated stream of water into the central portion of said sludge zone while at a temperature above that of said electrically-treated constituents to aid directly in the resolution of said sludge and to aid in establishing a thermal upward flow moving sludge from the vicinity of said sludge zone toward said electric field.

12. A method as defined in claim 11, in which said stream of water is heated by injection of steam thereinto to condense at least a portion of the steam.

13. A method as defined in claim 11, in which said stream of water is heated by injection of steam thereinto in amount greater than that which can condense therein whereby said heated stream of water discharged into said central portion of said sludge zone comprises steam.

14. A method for removing water-associable impurities comprising water-soluble and water-wettable materials from a mineral oil containing no more than a few per cent of water, which method includes the steps of: mixing relatively fresh water with said oil to produce an oil-continuous emulsion; establishing an electric field in an oil environment of a chamber, said field being of sufficient intensity to coalesce the dispersed water of said emulsion and associate impurities therewith; continuously introducing a stream of said emulsion into said electric field in a manner to establish in said oil environment a closed circulation of oil comprising partially coalesced water moving through a closed circulation path traversing said electric field whereby coalesced droplets of water of insufficient size to gravitate from said closed circulation path are returned to said electric field for additional coalescence therein, coalesced water droplets of sufficient size to gravitate from said closed circulation path settling therefrom to produce a body of separated water below said electric field; utilizing such intimacy of mixing of said oil and relatively fresh water as will tend to produce sludge comprising unresolved emulsion in a sludge zone above said body of water and below said electric field; and introducing steam at a position adjacent the central portion of said sludge zone to aid directly in the resolution of said sludge and to move sludge comprising unresolved emulsion upward to said circulation path for re-treatment in said electric field, said intimacy of mixing being such as to permit substantially complete resolution of said emulsion when employing said steam introduction without the building up of said sludge to pervade and short-circuit said electric field.

15. A method of substantially completely resolving a water-in-oil type of emulsion, which method includes the steps of: subjecting said emulsion to the action of an electric field of sufficient intensity to coalesce at least a portion of the dispersed water into gravitationally separable masses and subjecting the electrically-treated constituents to gravitational action in a chamber, whereby bodies of oil and water form in this chamber, said constituents tending to form a layer of sludge in a sludge zone between said bodies of oil and water, said sludge comprising a fine-grained, compacted, water-in-oil emulsion; and jetting a stream of steam directly into said sludge zone to aid in the resolution of said sludge.

LOUIS E. McDONALD.